(12) United States Patent
Qian (10) Patent No.: US 7,680,806 B2
(45) Date of Patent: Mar. 16, 2010

(54) REDUCING OVERFLOW OF HASH TABLE ENTRIES

(75) Inventor: Jianguo Qian, Union City, CA (US)

(73) Assignee: Cisco Technology, Inc., San Jose, CA (US)

(\*) Notice: Subject to any disclaimer, the term of this patent is extended or adjusted under 35 U.S.C. 154(b) by 860 days.

(21) Appl. No.: 11/130,887

(22) Filed: May 17, 2005

(65) Prior Publication Data

US 2006/0265370 A1    Nov. 23, 2006

(51) Int. Cl.
*G06F 17/00*    (2006.01)
*G06F 7/00*    (2006.01)
(52) U.S. Cl. .................... 707/101; 707/7; 707/104.1
(58) Field of Classification Search .................... 707/7, 707/101, 104.1
See application file for complete search history.

(56) References Cited

U.S. PATENT DOCUMENTS

| | | | | |
|---|---|---|---|---|
| 5,032,987 A * | 7/1991 | Broder et al. | ............... | 711/221 |
| 5,414,704 A * | 5/1995 | Spinney | ..................... | 370/389 |
| 5,897,637 A * | 4/1999 | Guha | ......................... | 707/101 |
| 5,920,900 A * | 7/1999 | Poole et al. | .................. | 711/216 |
| 6,134,546 A * | 10/2000 | Bestgen et al. | ................. | 707/4 |
| 6,212,525 B1 * | 4/2001 | Guha | ......................... | 707/101 |
| 6,449,613 B1 * | 9/2002 | Egolf et al. | ..................... | 707/7 |
| 6,515,963 B1 * | 2/2003 | Bechtolsheim et al. | ...... | 370/229 |
| 6,539,373 B1 * | 3/2003 | Guha | ............................ | 707/4 |
| 6,567,817 B1 * | 5/2003 | VanLeer | .................... | 707/102 |
| 6,775,281 B1 * | 8/2004 | Brown | ....................... | 370/392 |
| 6,862,287 B2 * | 3/2005 | Brown | ....................... | 370/401 |
| 6,862,602 B2 * | 3/2005 | Guha | ......................... | 707/101 |
| 7,020,713 B1 * | 3/2006 | Shah et al. | .................. | 709/235 |
| 7,043,494 B1 * | 5/2006 | Joshi et al. | ................... | 707/101 |
| 7,085,911 B2 * | 8/2006 | Sachedina et al. | ........... | 711/206 |
| 7,136,861 B1 * | 11/2006 | Sinclair et al. | .............. | 707/101 |
| 7,373,514 B2 * | 5/2008 | Krueger et al. | .............. | 713/181 |
| 2002/0073068 A1 * | 6/2002 | Guha | ............................ | 707/1 |
| 2003/0026259 A1 * | 2/2003 | Brown | ......................... | 370/392 |
| 2003/0204698 A1 * | 10/2003 | Sachedina et al. | ........... | 711/170 |
| 2003/0218978 A1 * | 11/2003 | Brown | ......................... | 370/230 |
| 2004/0085953 A1 * | 5/2004 | Davis | ......................... | 370/356 |
| 2004/0230696 A1 * | 11/2004 | Barach et al. | ............... | 709/238 |
| 2005/0021503 A1 * | 1/2005 | Chiang | ......................... | 707/2 |
| 2005/0141519 A1 * | 6/2005 | Rajgopal et al. | ........ | 370/395.32 |
| 2005/0147113 A1 * | 7/2005 | Brown | ......................... | 370/428 |
| 2008/0112401 A1 * | 5/2008 | Brown | ......................... | 370/383 |

OTHER PUBLICATIONS

Aspnes, James, et al., "Load Balancing and Locality in Range-Queriable Data Structures", PODC '04, St. Johns, Newfoundland, Canada, Jul. 25-28, 2004, pp. 115-124.*

Hutflesz, Andreas, et al., "Globally Order Preserving Multidimensional Linear Hashing", ICDE 1988, Los Angeles, CA, Feb. 1-5, 1988, pp. 572-579.*

(Continued)

*Primary Examiner*—Robert Stevens
(74) *Attorney, Agent, or Firm*—Charles E. Krueger (57) ABSTRACT

An apparatus and method for reducing overflow in a hash table lookup mechanism that moves entries from full or nearly full buckets in one hash table to less full buckets of another hash table. The number of bucket overflows caused by hashing input addresses can be reduced.

8 Claims, 6 Drawing Sheets

OTHER PUBLICATIONS

Ma, Vincent C. H., et al., "Low Latency Photon Mapping Using Block Hashing", Graphics Hardware, © 2002, pp. 89-99 and 158.*

Graefe, Goetz, et al., "Hash Joins and Hash Teams in Microsoft SQL Server", Proc. of the 24th VLDB Conf., New York, NY, © 1998, pp. 86-97.*

Omiecinski, Edward, "Performance Analysis of a Load Balancing Hash-Join Algorithm for a Shared Memory Multiprocessor", Proc. of the 17th International Conf. on VLDB, Barcelona, Spain, Sep. 1991, pp. 375-385.*

Quinlan, Sean, et al., "Venti: A New Approach to Archival Storage", FAST, Jan. 2002, pp. 1-13.*

"Linear Feedback Shift Registers", New Wave Instruments, Jun. 21, 2002, pp. 1-8.*

Pagiamtzis, Kostas, "CAM Primer", www.eecg.toronto.edu/~pagiamt/cam/camintro.html, Jan. 7, 2005, pp. 1-6.*

Devine, Robert, "Design and Implementation of DDH: A Distributed Dynamic Hashing Algorithm", FODO '93, Chicago, IL, Oct. 13-15, 1993, pp. 101-114.*

Slide Notes: Hashing and Hash Tables, 7 pages, downloaded from the Internet: <http://yenigul.net/tpop/handouts/C__Hash__Tables.htm>.

\* cited by examiner

REDUCING OVERFLOW OF HASH TABLE ENTRIES

BACKGROUND OF THE INVENTION

Figure 1:
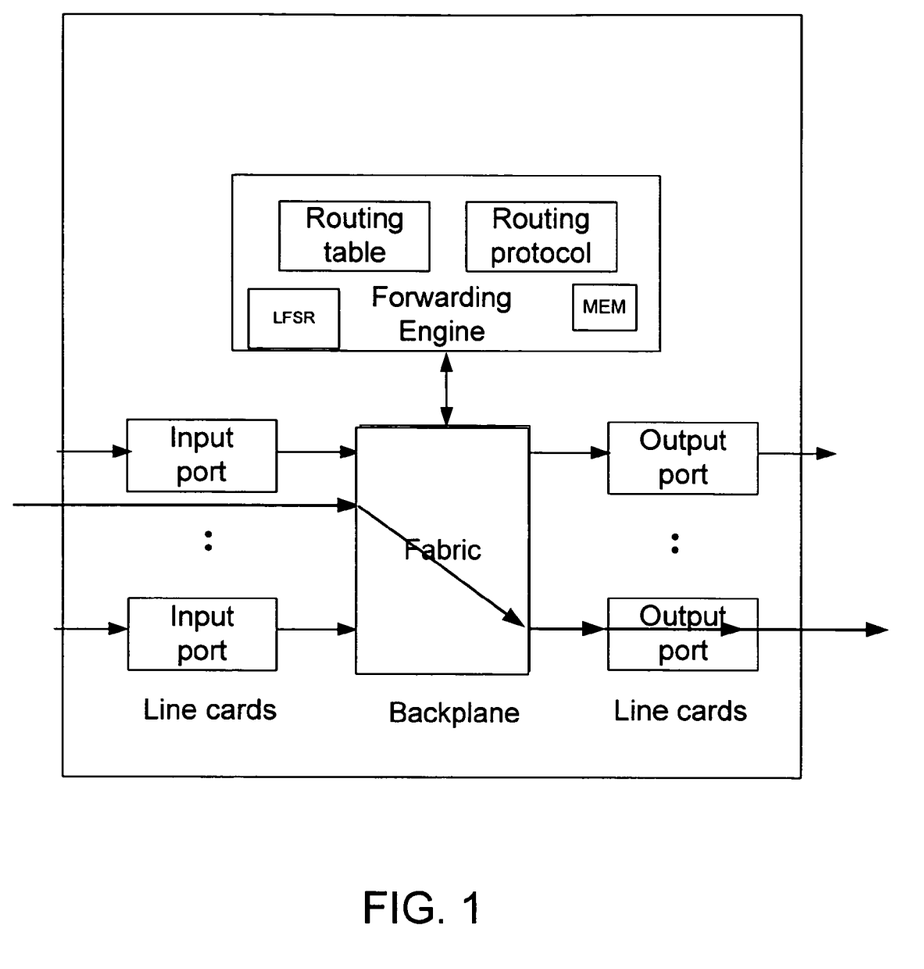
FIG. 1 is a block diagram of a switch architecture.

Table lookup is a common operation performed by many Internet switches and routers. As depicted in FIG. 1, a typical switch includes a Forwarding Engine, Line Cards, and a Switching Fabric which can be implemented as Application Specific Integrated Circuits (ASICs). The forwarding engine is a processor that has a group of tables which may include an L2 table with MAC addresses, an L3 table with IP addresses, a NetFlow table with flow identifiers, and other tables with L4-L7 information. The address lookup function examines a packet's destination address, stored in a table, and selects an output port associated with that address.

Looking up an address in a table is usually combined with a hashing operation and the performance of the lookup process depends on both the hash function and the table organization. In the switch depicted in FIG. 1, the hashing operation is performed by Linear Feedback Shift Registers (LFSRs) for high speed. Doing a lookup operation means searching for an item in the table. When the item is found (Hit), the table location will also contain other information related to the further processing for that item. For example, on L2 forwarding tables, lookup is done on MAC addresses and the related information contained in the table is the port that first received the MAC address. On L3 forwarding tables, lookup is done on IP addresses and the related information is the port where packets destined to that IP address should be sent.

When the item is not found on the table it will be inserted (Learning phase), and if it is not possible to learn a new entry, then the item will be dropped (Miss). Usually hardware lookups resulting in a miss will be redirected to software, thus slowing down the performance. Tables can be implemented in various ways, including using RAM (e.g. DRAM, Synchronous DRAM (SDRAM), Reduced Latency DRAM (RLDRAM) or Ternary Content Addressable Memory (TCAM)).

Figure 2:
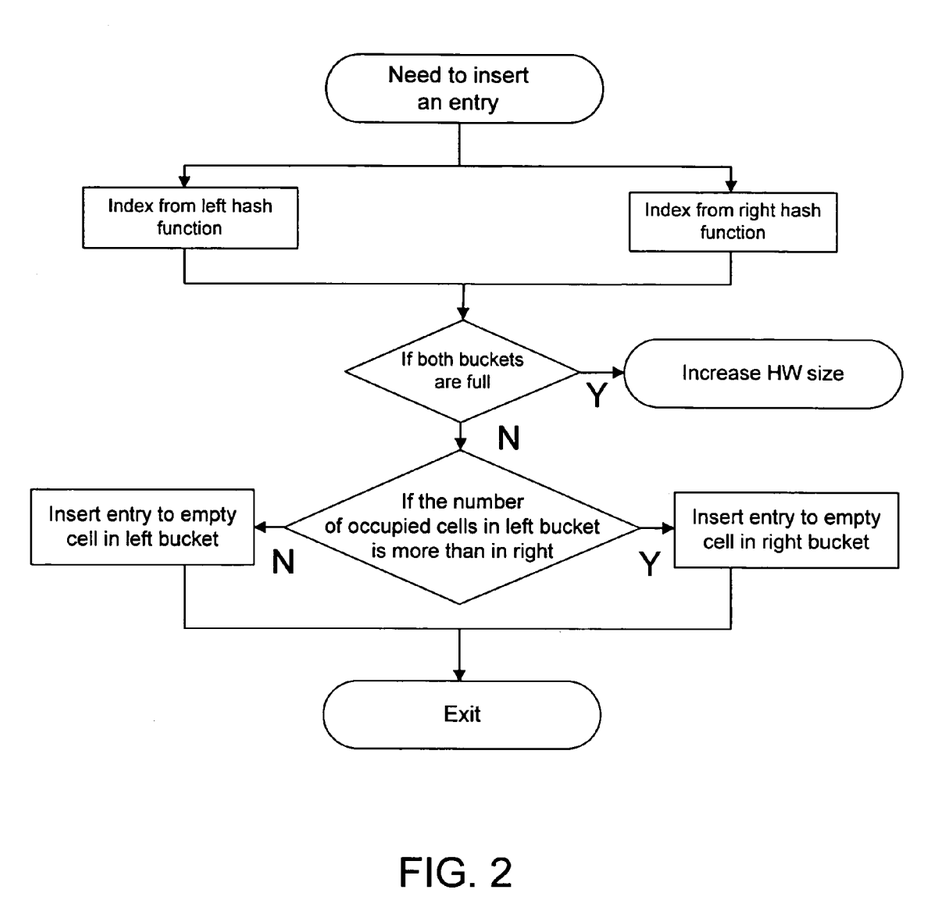
FIG. 2 is a flow chart depicting the operation of the D-Left Hashing algorithm.

A common search mechanism employed is called D-Left Hashing which is depicted in the flow chart of FIG. 2. D-Left hashing uses two hash tables with two different primitive polynomial hash functions. The search key is hashed with two different and uncorrelated hash functions. The hash functions reduce the key from a large number of bits to a smaller number of bits in a pseudo-random manner. The result of the first hash function is used as an index into the left table. An identical process is followed by using the second hash function and the right table, in parallel with the process performed by the left table.

Since keys in the tables are unique, a key which matches the key data of an entry results in a unique match, and the associated data of that entry is output from the search function. Each table contains as many rows, or buckets, as there are possible results from the hash function. For example, if the hash function produces an 11-bit value then there will be $2^{11}$, or 2048, buckets in each table. If each table bucket contains four cells, then up to four keys which hash to the same bucket index can be stored in that bucket. The key data field in each of the buckets is compared against the original search key to determine if there is a match.

The D-Left hashing mechanism could easily generate hashing overflow, when all cells are occupied by the index of these two hash tables. As such, additional hardware resources are needed to resolve the overflow. The more overflow generated, the more additional hardware resources are needed.

The challenges in the field of table lookup continue to increase with demands for more and better techniques having greater flexibility and adaptability. Therefore, a need has arisen for a new apparatus and method for efficient and low-cost table lookup techniques.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

In one embodiment of the invention, an optimization algorithm improves the D-Left hashing algorithm. The optimization applies to existing hash tables at any time when insertion or deletion of hash table entries occurs.

The following is an example that will trigger this optimization when both left and right buckets indexed by a new entry have the same number of occupied cells during an insertion attempt. In this case, a new entry X is to be inserted into the hash table. The LeftHash function generates a left index LI(X) to a bucket in the left hash table and the RightHash function generates a right index RI(X) to a bucket in the right hash table. If both the left and right buckets contain the same number (J) of occupied cells, the new algorithm will examine each of the occupied cells in the left and right indexed buckets from 0 to (J−1).

Figure 3:
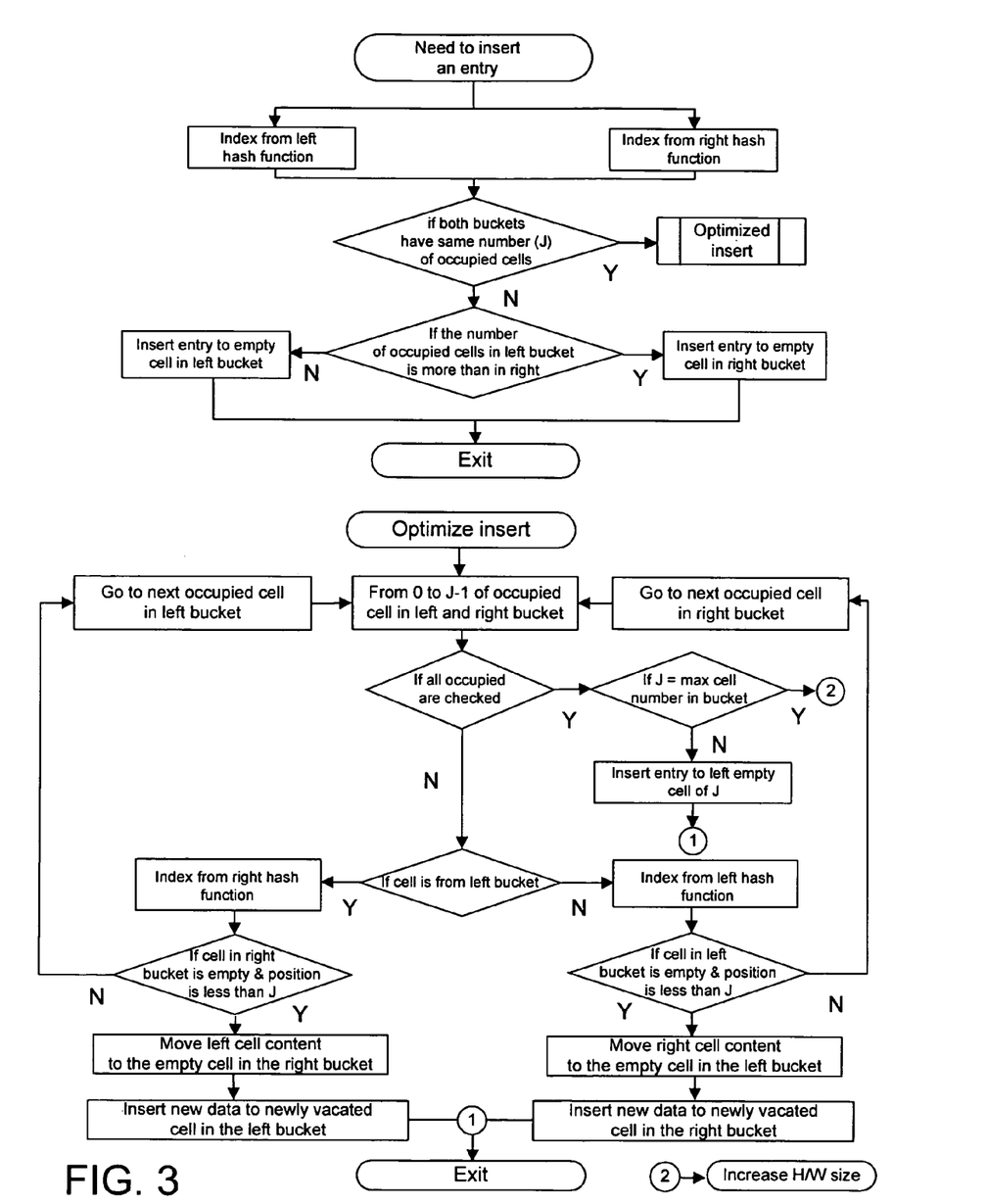
FIG. 3 is a flow chart depicting the operation of an algorithm used in an embodiment of the invention.
Figure 4A:
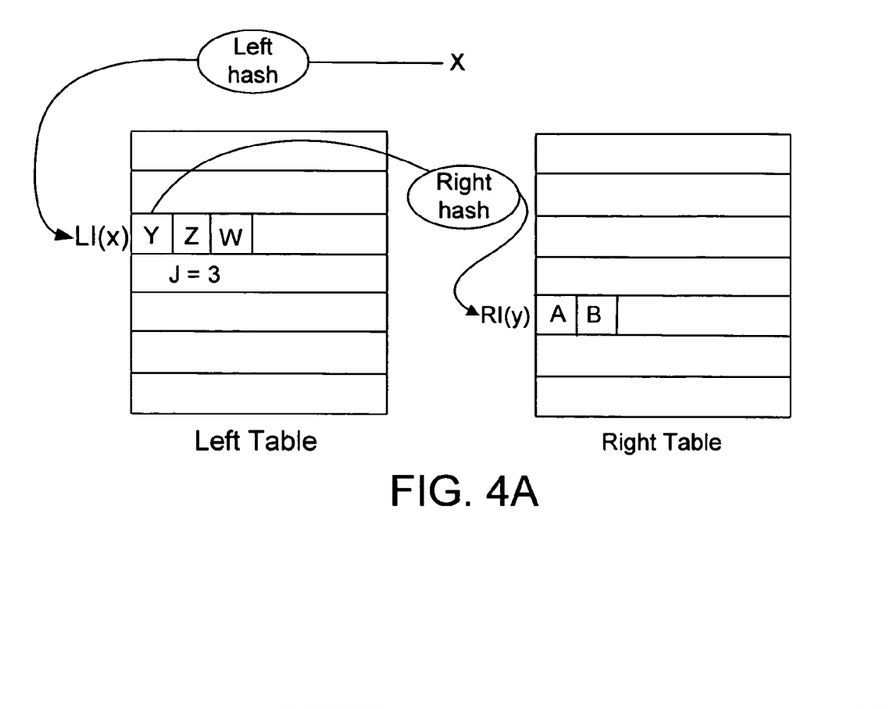
FIGS. 4A and B are block diagrams depicting a first example of the operation of the algorithm of an embodiment of the invention.

The operation of the algorithm will now be described with reference to the flow chart of FIG. 3 and the block diagram of FIG. 4A where both the left and right buckets indexed by the new entry X have J stored entries. In FIG. 4A, the first cell, L(j=0), in the left bucket indexed by LI(X) holds the entry Y. The RightHash function is applied to the stored entry Y to generate a left hash index RI(Y) to a right bucket in the right hash table. In this example, the number of entries in the right bucket indexed by RI(Y) is equal to 2 which is less than J=3.

In the following the term "moved" is utilized to describe either the operation of moving or the operation of copying an entry to a new cell in a different bucket. Further, a cell is described as "empty" after the entry has been moved and another entry may be written to the cell. The term empty can be applied to a cell that holds data the has been moved and can now be overwritten.

Figure 4B:
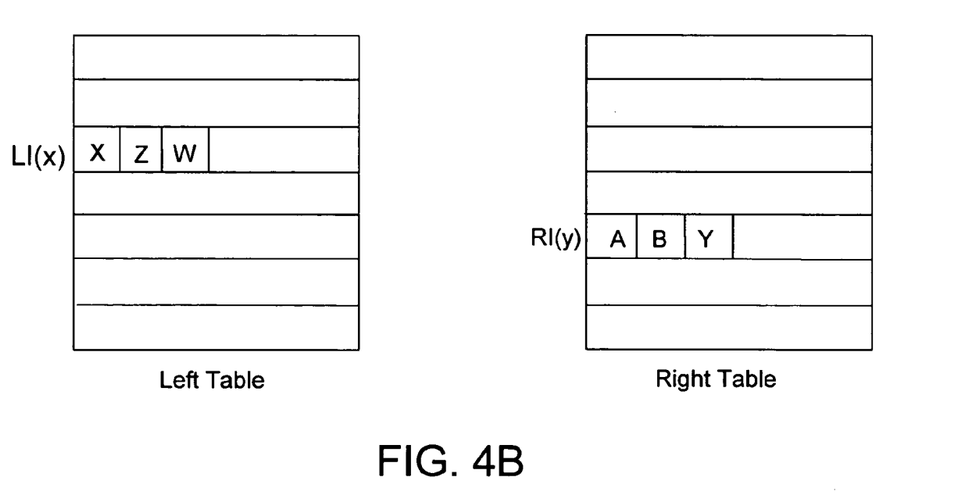

The entry Y held in cell L(j=0) in the left bucket indexed by LI(X) is now moved to the cell R(j=2) in the right bucket indexed by RI(Y) and the entry X is inserted into the now empty cell L(j=0) of the left bucket. In this way the number of entries in the buckets is balanced. The configuration of the tables after the application of the algorithm is depicted in FIG. 4B.

Figure 5A:
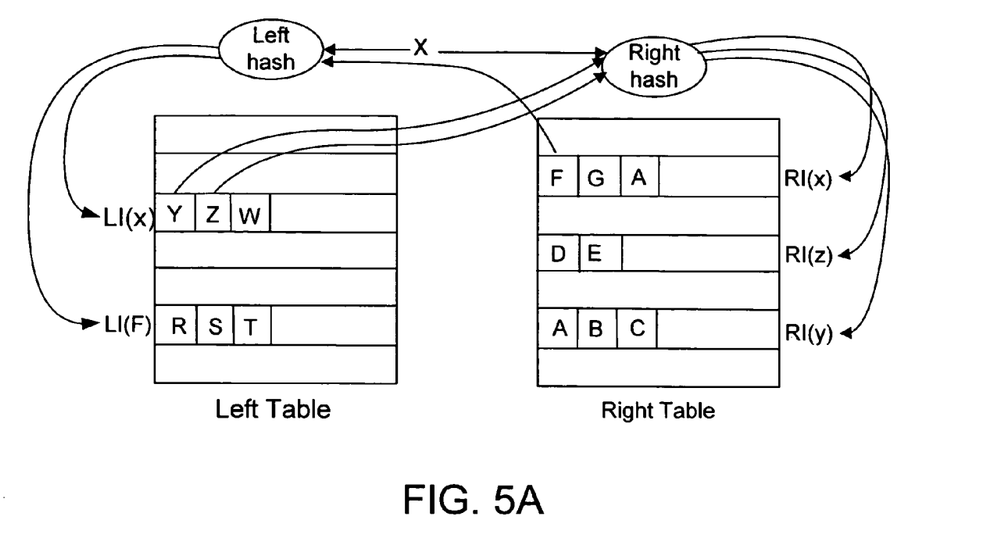
FIGS. 5A and 5B are block diagrams depicting a second example of the operation of the algorithm of an embodiment of the invention.

In the example FIG. 5A, as was the case for FIG. 4A, The LeftHash function generates a left index LI(X) to a bucket in the left hash table and the RightHash function generates a right index RI(X) to a bucket in the right hash table. If both the left and right buckets contain the same number (J) of occupied cells, the new algorithm is invoked. In this example, the LI(X) bucket holds the stored entries Y, Z, W and the RI(X) bucket holds the stored entries F, G, A so that both buckets hold the same number, J=3, of stored entries.

The algorithm starts by checking the first entry in the left hash table. The right hash function is applied to the entry Y, held in L(j=0) of the LI(X) bucket, to index the right bucket RI(Y) which also holds J=3 entries. Now the algorithm switches to the right hash table to examine the entry F, held in the cell R(j=0) of RI(X). In this example the LI(F) bucket of the left hash table also holds J=3 entries.

The algorithm then switches back to the left hash table to examine the next cell L(j=1) in the left bucket indexed by LI(X). The RightHash function is applied to Z, the entry held in L(j=1) of the left bucket, to generate the index RI(Z) of a right bucket. In this example the number of entries in the right bucket indexed by RI(Z) is equal to 2 which is less than J=3.

Figure 5B:
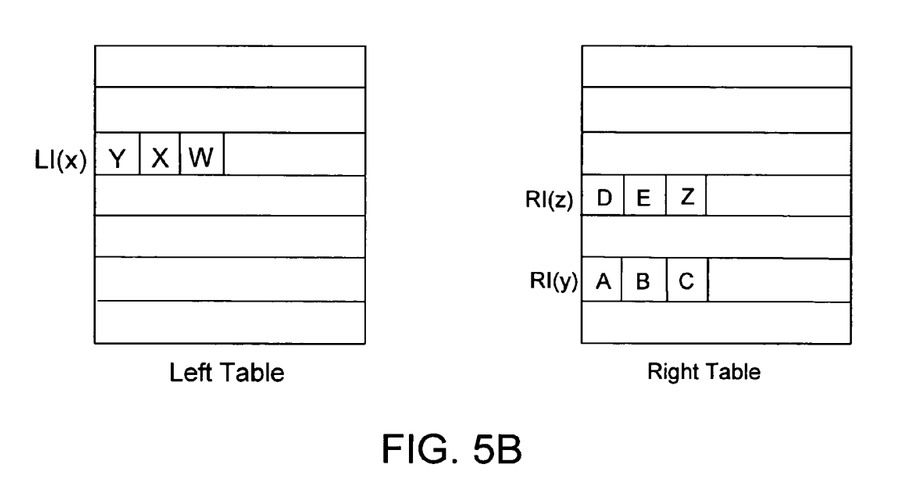

The entry Z held in cell L(j=1) in the left bucket indexed by LI(X) is now moved to the cell R(j=2) in the right bucket indexed by RI(Z) and the entry X inserted into the now empty cell L(j=1) of the left bucket. In this way the number of entries in the buckets is balanced. The configuration of the tables after the application of the algorithm is depicted in FIG. 5B.

If the bucket indexed by RI(Z) did not have less than J entries then the cell R(j=1) of the RI(X) bucket would be examined an so on. Thus the algorithm alternately examines successive cells in the left and right buckets indexed by the new entry X.

In another embodiment, the algorithm is expanded in a recursive way, when all J entries of first level buckets are occupied, optimization is applied to those entries of subsequent level buckets until a loop is formed when the algorithm returns to the original hash bucket. If all J entries of buckets traversed are full, then X must be inserted into a J+1 entry.

Figure 6A:
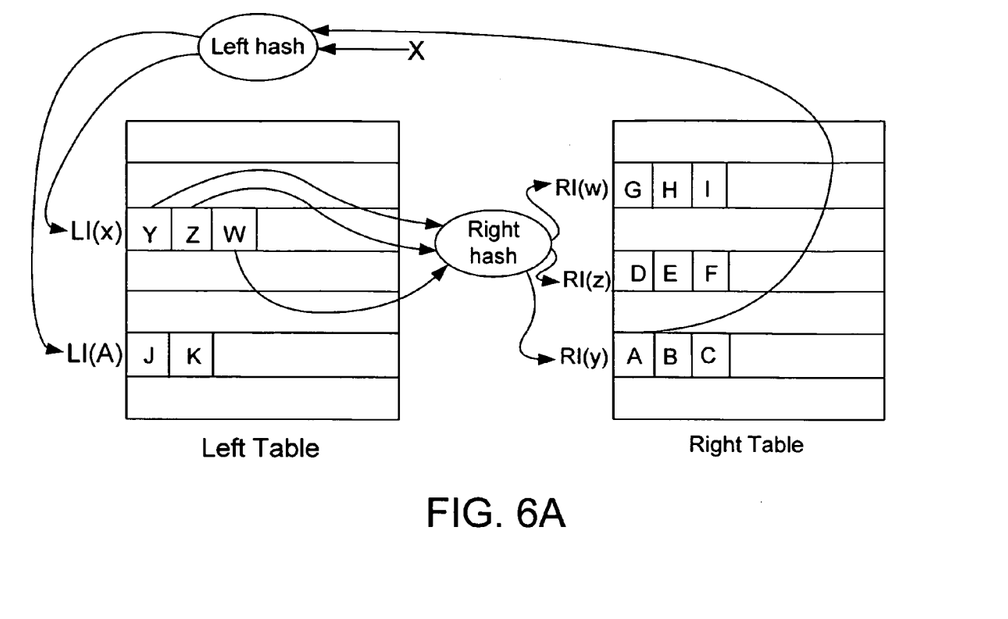
FIGS. 6A and B are block diagrams depicting a example of the recursive operation of the algorithm of an embodiment of the invention.

In FIG. 6A, all the buckets in the right hash table indexed by entries held in the occupied cells of the bucket indexed by LI(X) and RI(X) have J or more entries (only LI(X) is depicted in FIG. 6A). The algorithm is applied to the bucket indexed by the entry Y held in the first cell of the left bucket indexed by LI(X). In this example the algorithm is applied to the cells in the right bucket in the right hash table indexed by RI(Y).

The entry held in the first cell in the right bucket indexed by RI(Y) is A. The LeftHash function is applied to the stored entry A to generate left hash index LI(A) to a left bucket in the left hash table. In this example, the number of entries in the bucket indexed by LI(A) is equal to 2 which is less than J=3.

Figure 6B:
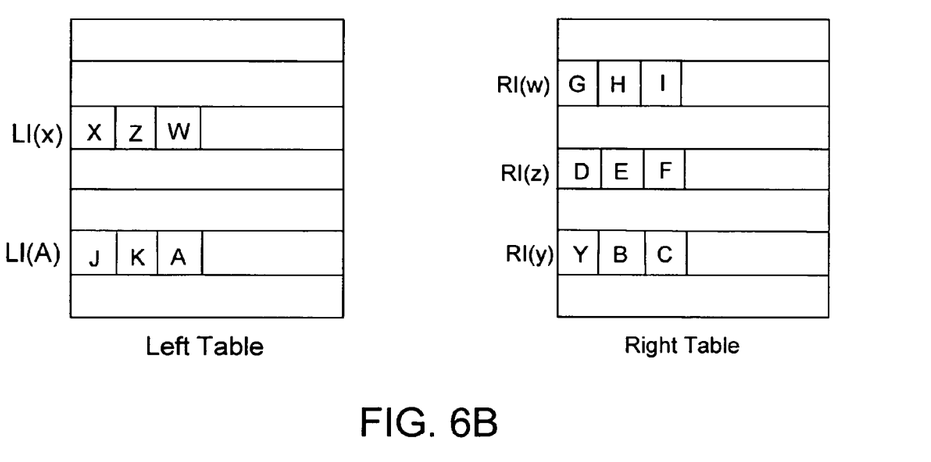

The entry A held in cell R(j=0) in the right bucket indexed by RI(Y) is now moved to the cell L(j=2) in the left bucket indexed by LI(A) and the entry Y held in cell L(j=0) in the left bucket indexed by LI(X) is moved to the now empty cell R(j=0) in the right bucket indexed by RI(Y). Then, the entry X is inserted into the now empty cell L(j=0) in the left bucket indexed by LI(X). In this way the number of entries in the buckets is balanced. The configuration of the tables after the application of the algorithm is depicted in FIG. 6B.

The invention may be implemented as program code, stored on a computer readable medium, that is executed by a digital computer. The computer readable medium may include, among other things, magnetic media, optical media, electromagnetic fields encoding digital information, and so on.

The invention has now been described with reference to the preferred embodiments. Alternatives and substitutions will now be apparent to persons of skill in the art. In particular, although the above described embodiment utilizes only two hash tables the principles of the invention can be applied to systems using more than two hash tables. Further, the invention has utility in other applications besides switches or routers such as processor caches, translation lookaside buffers, data compression applications, database accelerators, neural networks, and so on. Additionally, although hashing utilizing LFSRs is described, hashing may also be performed by a processor executing software. Further, in the above description the tables have been designated as right and left. Persons of skill in the art realize these terms are only identifiers and there is no geometrical significance to the terms. Accordingly, it is not intended to limit the invention except as provided by the appended claims.

What is claimed is:

1. A method comprising:

hashing a new entry with a first hash function (FHF), implemented by hardware in a forwarding engine, to generate a first FHF index to a first hash table (FHT);

hashing the new entry with a second hash function (SHF), implemented by hardware in the forwarding engine, to generate a first SHF index to a second hash table (SHT), with the first and second hash tables each having a plurality of buckets identified by an index and with each bucket including a plurality of cells for holding entries where the FHF and SHF are different and uncorrelated hash functions;

accessing a first FHT bucket with the first FHF index utilizing logic in the forwarding engine;

accessing a first SHT bucket with the first SHF index utilizing logic in the forwarding engine;

hashing a first FHT entry from a first FHT cell in the first FHT bucket of the first hash table with the second hash function to index a second SHT bucket in the second hash table if the first FHT bucket of the first hash table and the first SHT bucket of the second hash table each hold J entries, where J is a positive integer;

moving only the first FHT entry to the second SHT bucket of the second hash table, utilizing logic in the forwarding engine, if the number of entries held in the second SHT bucket is less than J; and storing the new entry in the first FHT cell of the first FHT bucket of the first hash table utilizing logic in the forwarding engine.

2. The method of claim 1 further comprising:

hashing a first SHT entry from a first SHT cell of the first SHT bucket of the second hash table with the first hash function to index a second FHT bucket in the first hash table if the number of entries held in the second SHT bucket of the second hash table is greater than or equal to J;

moving only the first SHT entry from the first SHT cell of the first SHT bucket to the second FHT bucket of the first hash table utilizing logic in the forwarding engine; and storing the new entry in the first SHT cell of the first SHT bucket of the second hash table utilizing logic in the forwarding engine.

3. The method of claim 2 further comprising:

alternately hashing selected entries from the first FHT bucket and first SHT bucket until an indexed target bucket having less than J stored entries is found;

moving only a stored entry to the indexed target bucket indexed by the stored entry to leave an empty cell in either the first FHT bucket or first SHT bucket utilizing logic in the forwarding engine; and storing the new entry in the empty cell utilizing logic in the forwarding engine.

4. The method of claim 1 further comprising:

hashing a first SHT entry of the second SHT bucket with the first hash function to index a second FHT bucket in the first hash table if the number of stored entries in the second SHT bucket is greater than or equal to J;

moving only the first SHT entry from the second SHT bucket to the second FHT bucket, utilizing logic in the forwarding engine, to leave an empty SHT cell in the second SHT bucket if the second FHT bucket holds less than J entries;

moving only the first FHT entry from first FHT bucket to the empty SHT cell of the second SHT bucket to leave an empty FHT cell in the first FHT bucket utilizing logic in the forwarding engine; and storing the new entry in the empty FHT cell of the first FHT bucket utilizing logic in the forwarding engine.

5. An apparatus comprising:

a memory system holding a first hash table (FHT) and a second hash table (SHT), with the first and second hash tables having a plurality of buckets identified by an index and with each bucket including a plurality of cells for holding entries, and with the memory system also holding computer program code;

hardware logic coupled to said memory system configured to access said first and second hash tables and configured to hash a new entry with a first hash function (FHF) to generate a first FHF index to the first hash table, hash the new entry with a second hash function (SHF) to generate a first SHF index to the second hash table where the FHF and SHF are different and uncorrelated hash functions, access a first FHT bucket with the first FHF index, access a first SHT bucket with the first SHF index, hash a first FHT entry from a first FHT cell in the first FHT bucket of the first hash table with the second hash function to index a second SHT bucket in the second hash table if the first FHT bucket of the first hash table and the first SHT bucket of the second hash table each hold J entries, where J is a positive integer, move only the first FHT entry to the second SHT bucket of the second hash table if the number of entries held in the second SHT bucket is less than J, and store the new entry in the first FHT cell of the first FHT bucket of the first hash table.

6. The apparatus of claim 5 with the hardware logic further configured to:

hash a first SHT entry from a first SHT cell of the first SHT bucket of the second hash table with the first hash function to index a second FHT bucket in the first hash table if the number of entries held in the second SHT bucket of the second hash table is greater than or equal to J;

move only the first SHT entry from the first SHT cell of the first SHT bucket to the second FHT bucket of the first hash table; and store the new entry in the first SHT cell of the first SHT bucket of the second hash table.

7. The apparatus of claim 6 with the hardware logic further configured to:

alternately hash selected entries from the first FHT bucket and first SHT bucket until an indexed target bucket having less than J stored entries is found;

move a stored entry to the indexed target bucket indexed by the stored entry to leave an empty cell in either the first FHT bucket or first SHT bucket; and store the new entry in the empty cell.

8. The apparatus of claim 5 with the hardware logic further configured to:

hash a first SHT entry of the second SHT bucket with the first hash function to index a second FHT bucket in the first hash table if the number of stored entries in the second SHT bucket is greater than or equal to J;

move the first SHT entry from the second SHT bucket to the second FHT bucket to leave an empty SHT cell in the second SHT bucket if the second SHT bucket holds less than J entries;

move only the first FHT entry from first FHT bucket to the empty SHT cell of the second SHT bucket to leave an empty FHT cell in the first FHT bucket; and store the new entry in the empty FHT cell of the first FHT bucket.

* * * * *